United States Patent [19]

Kedda

[11] 4,222,759
[45] Sep. 16, 1980

[54] PROCESS FOR MAKING GLASS DESIGN PIECES

[76] Inventor: Helena M. Kedda, 9012 Spring Hill La., Chevy Chase, Md. 20015

[21] Appl. No.: 72,604

[22] Filed: Sep. 5, 1979

[51] Int. Cl.³ .................................................. C03C 27/00
[52] U.S. Cl. .......................................... 65/23; 65/36; 65/43
[58] Field of Search ................ 65/36, 42, 43, 45, 47, 65/48, 23

[56] References Cited

U.S. PATENT DOCUMENTS

| 762,925 | 6/1904 | Mygatt | 65/48 |
|---|---|---|---|
| 2,275,602 | 3/1942 | Beck et al. | 65/36 UX |
| 3,083,552 | 4/1963 | Carlson et al. | 65/48 |

FOREIGN PATENT DOCUMENTS

| 1185782 | 8/1959 | France | 65/47 |
|---|---|---|---|
| 535155 | 3/1941 | United Kingdom | 65/43 |

Primary Examiner—Arthur D. Kellogg
Attorney, Agent, or Firm—Stevens, Davis, Miller & Mosher

[57] ABSTRACT

A process for preparing at least a double thickness glass design piece with a rounded surface comprising gluing together with a heat destructible glue first and second glass pieces with the same contours, the second piece being smaller than the first by a margin completely surrounding the larger of ⅛ inch, firing the two pieces with the second piece being on top to fuse them and until the top edge of the top piece has rounded into the bottom piece and gradually cooling the fused design piece to room temperature.

3 Claims, 6 Drawing Figures

PROCESS FOR MAKING GLASS DESIGN PIECES

This invention relates to a process for creating a specific effect for glass design pieces. More particularly, the invention relates to a process for creating a rounded top surface for stained glass design pieces of any contour which are at least of double glass thickness and give a three-dimensional effect.

The invention also relates to a process for preparing decorative glass eyeballs, flower centers and similar special effects.

Heretofore in the making of glass design pieces it has been the practice to fire a single piece of glass of any profile until it reaches its softening temperature and then cool the piece as the rough edges of the glass piece begin to smooth out. Although the edges of the piece are smooth the glass is only of a single thickness and lacks depth in three-dimensional effect and richness in color.

Previously in the making of glass design pieces having at least a double thickness, the pieces were formed either by pouring molten glass into a mold or by dropping molten glass onto a flat surface. Because of these procedures the variety of shapes in contour of the design piece was rather limited due to the expense of providing a mold for every shape desired or due to the single circular shape obtainable by dropping the molten glass.

It is therefore an object of this invention to provide a process of obtaining a glass design piece of any desired contour having a rounded top surface.

Another object of this invention is to provide a process for obtaining a stained glass design piece having a rounded surface of a desired shape which is of at least double thickness.

The glass design piece produced in accordance with the invention is formed by cutting a single blank of glass to the desired configuration, cutting a second blank of glass to the same desired configuration but of a smaller size, sanding the edges of both pieces of glass to smooth the edges, gluing the two pieces of glass together, firing the two pieces of glass in a kiln until the top smaller section of the glass has rounded into the bottom larger section of the glass and slowly cooling the resultant design piece to room temperature.

When preparing eyeballs or flower centers in which the smaller piece of glass is partially encased in the larger piece the foregoing procedure is followed except that before cooling, the two pieces of glass are fired until the smaller piece is partially encased by the larger piece.

Other details and features of the invention will stand out from the description given below by way of non-limiting example and with reference to the accompanying drawings, in which.

Figure 1:
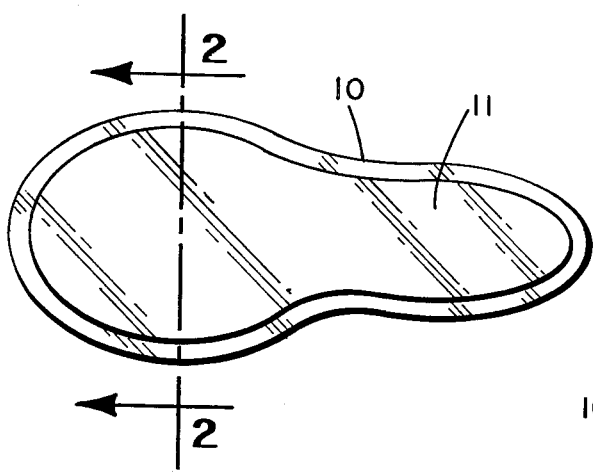
FIG. 1 is a plan view of two pieces of contoured glass prior to firing.
Figure 2:
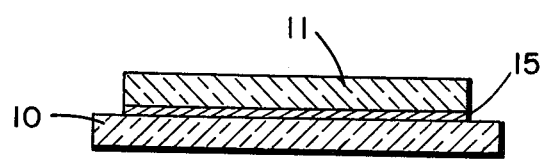
FIG. 2 is a cross-section through line 2-2 of FIG. 1.
Figure 3:
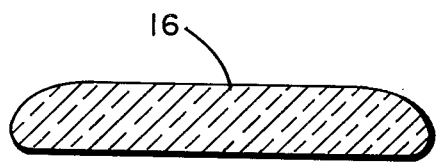
FIG. 3 is a cross section of FIG. 1 after firing.

Referring to FIGS. 1–3 a glass blank 10 is cut to the desired shape and sanded to render the outer shape smooth. A second glass blank 11 is cut to the same outside shape as the blank 10 but of a smaller size so that when positioned on blank 10 it will leave an uncovered area around the periphery of the blank 11 the width of which is about ⅛ inch. The cut blank 11 is then sanded to render the cut edges smooth after which the two cut blanks are then temporarily glued together with a destructible glue 15 which will disintegrate during the course of firing. The glue may be ELMERS ®. The glue is used only to keep the two cut blanks in the proper relative position during placement in the kiln and during initial firing. The kiln has kiln wash applied thereto and when dry has a sifting of separator applied. The glued article is placed in the kiln with the smaller cut glass blank on top. The kiln is then fired to approximately 1525–1625° F. for a period of from 45 to 75 minutes dependent upon the shape and color of the piece or until the top edge of the upper cut blank has rounded into the lower cut blank. The kiln is then turned off and vented until the kiln element has lost its glow to prevent over firing of the design piece. The piece is then allowed to cool in the kiln until reaching room temperature after which it is removed. The design piece 16 once removed from the kiln may be used individually as jewels to be mounted in rings or pendants or other design pieces as components of lead or other glass designs.

Although only two cut blanks have been shown in the drawings a design piece of greater depth and color may be obtained by utilizing three or more pieces of glass with the difference in size between adjacent pieces being a margin with a width of about 1/8 inch completely around the larger piece.

Figure 4:
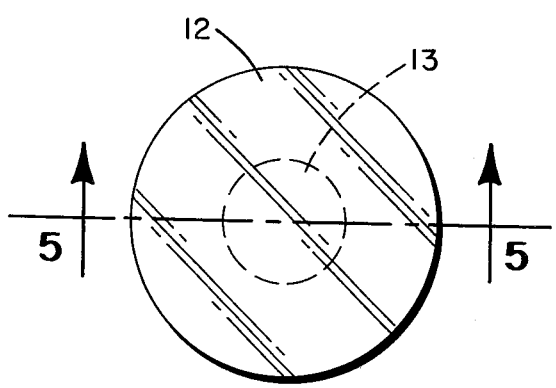
FIG. 4 is a plan view before firing of two pieces of glass to be formed into an eyeball.
Figure 5:
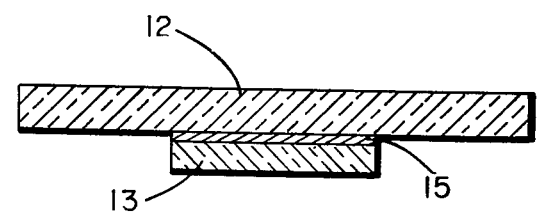
FIG. 5 is a cross-section of the product to be fired through line 5—5 of FIG. 4.
Figure 6:
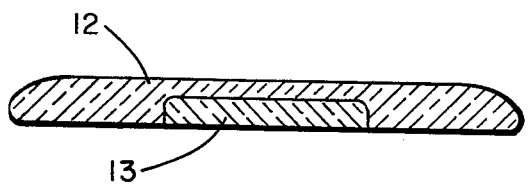
FIG. 6 is a cross-section of the fired product.

Referring to FIGS. 4–6 a glass blank 12 is cut to the desired shape and accordingly sanded to smooth the edges. A second glass blank 13 is cut to form the smaller element of the eyeball or flower center, sanded to smooth the edges and glued to the larger piece with heat destructible glue 15. The two pieces of glass with the larger piece on top of the smaller piece are then fired at a temperature of 1525–1625° F. for from 45 to 75 minutes or until the larger piece partially encases the smaller piece. The resultant design piece is then slowly cooled to room temperature. Although not illustrated the same design piece can be made by firing the two glued pieces in the kiln while positioning the smaller piece on top.

For purposes of this invention a single thickness of glass is considered to be ⅛ inch thick. The kiln may be of any type such as a Thompson or L & L. The stained glass is of the type sold commercially.

The firing temperature as well as the time of firing may vary depending upon the following:
1. color of glass
2. size of piece being fired
3. kiln
4. type of glass being fired
5. number of pieces being fired Should it be desired to fire together glass of different colors and/or compositions care should be taken to determine the compatibility of the glass because without compatibility a satisfactory design piece cannot be obtained.

What I claim is:

1. A process for preparing at least a double thickness glass design piece with a rounded surface comprising gluing together with a heat destructible glue first and second glass pieces with the same contours, said second piece being smaller than said first by a margin completely surrounding the larger of ⅛ inch, firing the two pieces with said second piece being on top to fuse them and until the top edge of the top piece has rounded into the bottom piece and gradually cooling the fused design piece to room temperature.

2. The process of claim 1, wherein the two glued pieces are fired at a temperature of from 1525–1625° F.

3. The process of claim 1, wherein a third piece of glass of the contour of the other two but smaller than the second by a margin of ⅛ inch is glued to the second with a heat destructible glue prior to firing.

* * * * *